United States Patent [19]

Huignard et al.

[11] Patent Number: 4,520,484
[45] Date of Patent: May 28, 1985

[54] COHERENT RADIATION SOURCE GENERATING A BEAM WITH A REGULATABLE PROPAGATION DIRECTION

[75] Inventors: Jean-Pierre Huignard; Marcel Malard, both of Paris, France

[73] Assignee: Thomson-CSF, Paris, France

[21] Appl. No.: 379,048

[22] Filed: May 17, 1982

[30] Foreign Application Priority Data

May 22, 1981 [FR] France ............................ 81 10248

[51] Int. Cl.³ .................................... H01S 3/101
[52] U.S. Cl. ................................ 372/24; 372/92; 372/108
[58] Field of Search ................ 372/21, 24, 108, 92, 372/99

[56] References Cited

U.S. PATENT DOCUMENTS 3,612,659 10/1971 Forward ........................ 350/163 R
3,643,178 2/1972 Marshall ........................ 331/94.5
3,790,252 2/1974 Pao ................................ 350/160 R
3,804,490 4/1974 Montgomery et al. ........... 350/161

Primary Examiner—James W. Davie
Attorney, Agent, or Firm—Cushman, Darby & Cushman

[57] ABSTRACT

The invention utilizes a laser cavity between two spherical mirrors, between which an oscillation wave propagates. An amplifying medium and an interaction medium are located on the path of the oscillation wave. A signal wave interferes with the oscillation wave in the interaction medium. A modulator of said wave makes it possible to initialize the process to obtain an output beam emerging in the desired direction.

9 Claims, 6 Drawing Figures

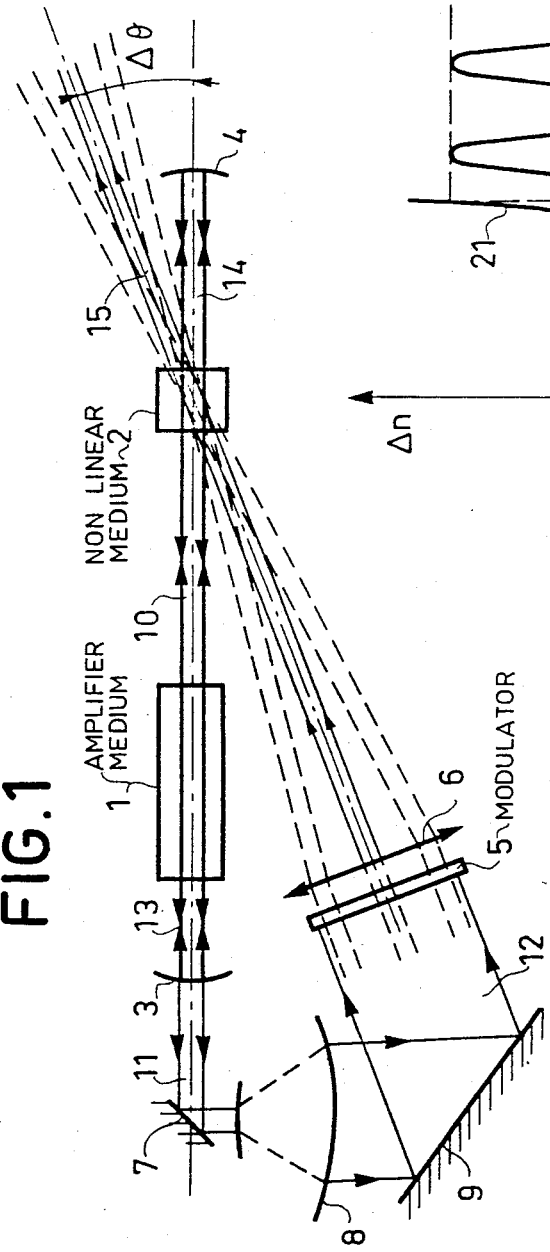
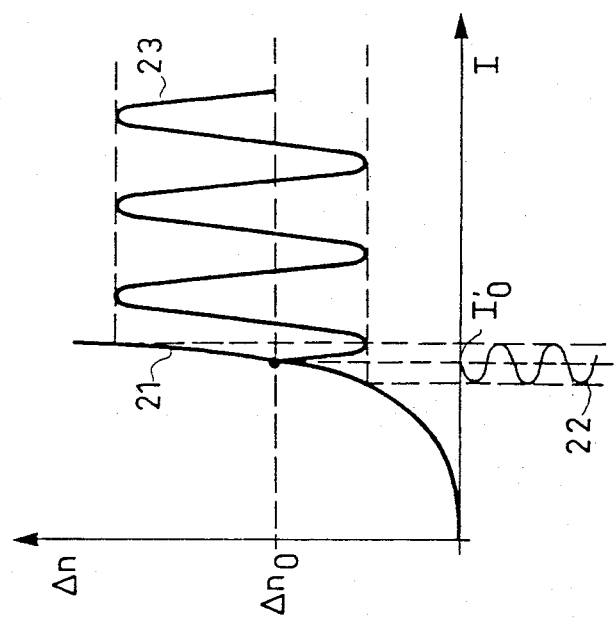
FIG.1
FIG.2

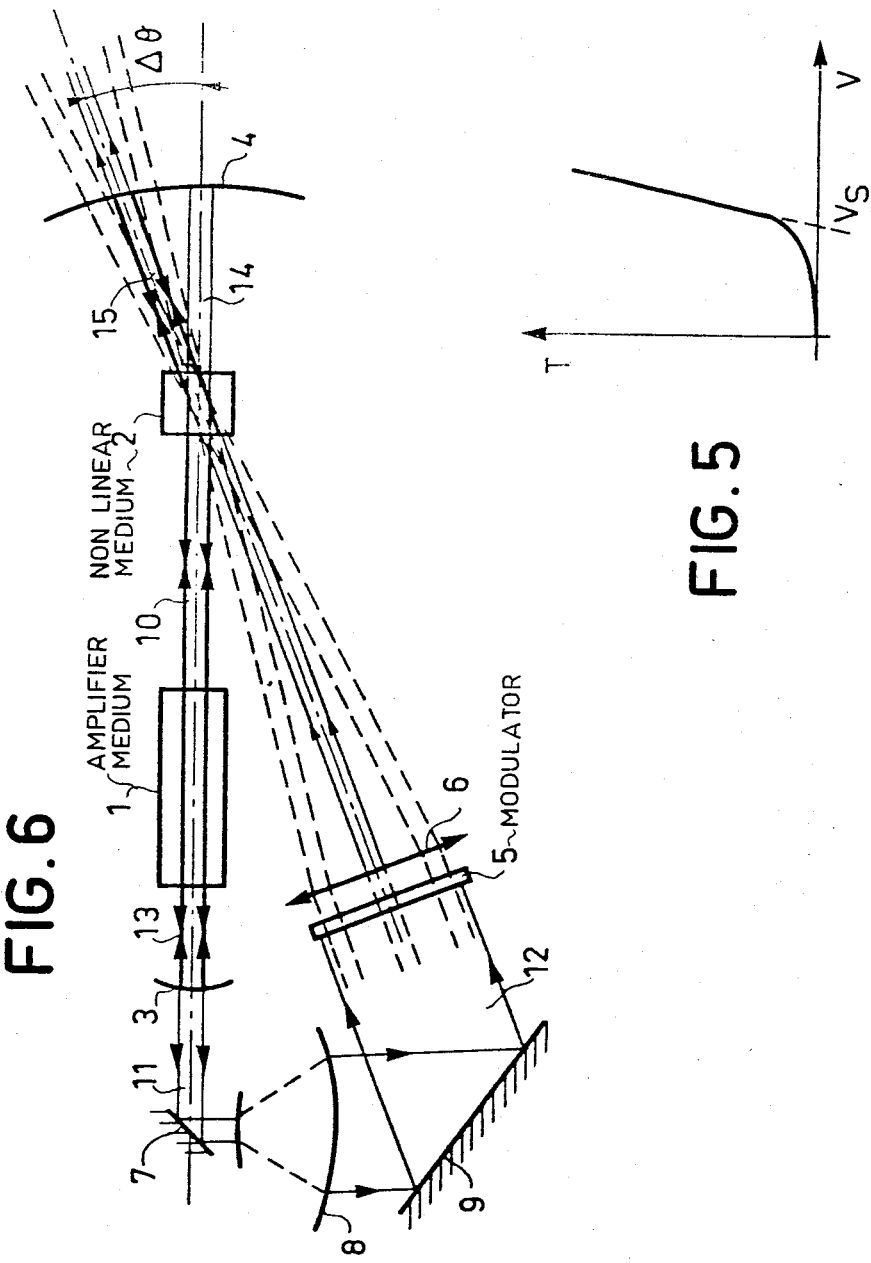

COHERENT RADIATION SOURCE GENERATING A BEAM WITH A REGULATABLE PROPAGATION DIRECTION

BACKGROUND OF THE INVENTION

The present invention relates to a coherent radiation source generating a beam having a regulatable propagation direction.

In a large number of laser applications, it is necessary to be able to rapidly change the beam direction, e.g. in optical memories, photo-composition and wide screen television. The most conventional and still very frequently used deflectors are rotary or vibratory mirrors. However, other devices without moving parts have been proposed and these are mainly constituted by acoustic and electrooptical deflectors.

If $\alpha_m$ is the maximum deflection angle and $\Delta\alpha$ the angle between two separable directions, it is possible to geometrically characterize a deflector by the number N of separate directions which can be imparted to the beam, giving $N=\alpha_m/\Delta\alpha$. In all cases, $\Delta\alpha$ is limited by the diffraction corresponding to the beam aperture.

With regards to the operating mode, a distinction is made between sequential and random deflections. The first mode corresponding to a continuous angular scan can be characterized by the number of scanned positions, per second. For example, a television picture with 625 lines and 25 images per second requires the successive scanning of $1.3 \times 10^7$ points per second. The random deflection necessary, for example, for giving access to an optical memory is characterized by the mean access time to a given direction or position.

On considering an electrooptical photosensitive medium, the interference between two incident beams in this medium ensures the generation of a system of lines having an appropriate spacing and orientation for deflecting the laser beam. This interference takes place in a three-dimensional medium. The physical characteristics of this medium and in particular the refractive index are spatially modulated by a system of fringes due to the interference of said two incident beams. As a result of this spatial modulation, inducing by gradient a system of lines, any incident beam can be diffracted in this way in a chosen direction. The two writing beams emanate from the same source, which can be e.g. a helium-cadmium laser after traversing a beam splitter.

BRIEF SUMMARY OF THE INVENTION

The device proposed by the invention permits the deflection in accordance with two axes of orthogonal coordinates X-Y of a laser beam by inserting a non-linear element in the laser cavity. It can, for example, be an electrooptical material, which serves as a support for the photo-induced system or network, whereof the appropriate spacing and orientation of the lines deflects the beam within the cavity. An optical modulator controllable in X-Y makes it possible to initialize the laser effect in the selected direction.

The device according to the invention has the following advantages:

it ensures the X-Y deflection of the laser beam in a random direction by non-mechanical means, the addressing time and number of points being totally independent parameters;

the non-linear medium is disposed in the cavity and consequently functions under optimum conditions, because the power density in the cavity is high;

the laser medium itself functions in a monomodal manner, because the angular deflection of the beam by the diffraction grating is compensated during an outward and return travel of the oscillation wave surface in the laser cavity.

The invention relates to a coherent radiation source producing a beam having a regulatable propagation direction, comprising on the one hand a laser cavity defined by two spherical mirrors, an oscillation wave propagating between these two mirrors, at least one of which has a non-zero transmission coefficient, and an amplifying medium being positioned on the path of the oscillation wave, and on the other hand an interaction medium receiving a signal wave under a predetermined incidence, the latter making it possible to determine the orientation of the beam, the interaction medium being located in the cavity between the amplifying medium and the second mirror, the centers of curvature of these two mirrors coinciding and located within the interaction medium, whilst modulating means located on the path of the signal wave enable the initialization of the oscillation by a laser effect for a particular orientation of the beam.

BRIEF DESCRIPTION OF THE DRAWINGS

The invention is described in greater detail hereinafter relative to non-limitative embodiments and with reference to the attached drawings, which show:

FIG. 1 a device according to the invention.

FIGS. 2 to 5 special aspects of the device according to the invention.

FIG. 6 a variant of the device according to the invention.

DETAILED DESCRIPTION OF THE PREFERRED EMBODIMENTS

Figure 3:
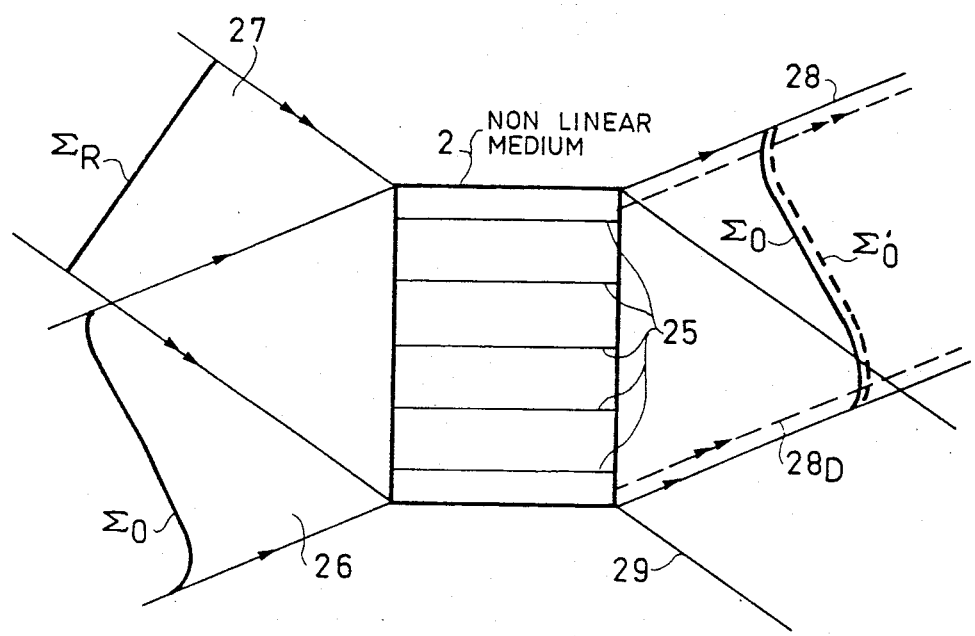

In the same way as an electrical oscillator essentially comprises an amplifier and a resonant circuit, the light oscillator comprises a light amplifying medium and a system of mirrors constituting what is called the "resonator" or by analogy with ultra-high frequency oscillators the "cavity" of the laser. An oscillation wave thus propagates within the said cavity.

In the device according to the invention shown in FIG. 1, the laser cavity comprises a solid, liquid or gaseous amplifying medium 1, two mirrors 3 and 4 having high reflection coefficients, mirrors 3 and 4 being spherical mirrors with coinciding centers of curvature and a non-linear medium 2 placed within the cavity containing the center of curvature of these mirrors, said non-linear medium serving as a deflector.

The laser effect in the selected direction is initialized by a modulator, which can e.g. be an electrooptical modulator 5 with a matrix access X-Y. The simultaneous action of voltages $V_X, V_Y$ bring about the opening of a transparent window of coordinates X-Y in the incident wave plane. An objective 6 enables a random 1 of the elementary pencils to pass through the center of curvature of mirrors 3 and 4. This elementary low energy beam makes it possible to initialize the laser effect in the cavity by choosing the deflection angle $\Delta\alpha$ of the output beam relative to the optical axis of the cavity.

A small amount of energy leaves the cavity through mirror 3 and is used for generating the signal wave. Beam 11 is consequently reflected by mirror 7 and by mirror 9 after traversing a beam widening means 8. It then illuminates the modulator in X-Y 5. The oscillation wave propagates in a straight line (13, 10, 14) between the two mirrors 3 and 4.

Medium 2 serves as an active mirror and taps a small amount of energy from the oscillation wave. Thus, a deflected beam 15 constituting the output beam is obtained.

The out of cavity losses are compensated by the gain of amplifying medium 1, which is sufficiently non-linear to have a high gain.

In FIG. 1, it is possible to see pencils of rays parallel to the output of modulator 5, which is in actual fact only true in an initial approximation. The distribution of a light pencil from a laser is a Gaussian function, but lens 6 makes it possible to compensate the divergences of the beam.

The deflection medium 2 utilizes the properties of certain optical media, called non-linear interaction, in which a small illumination variation leads to a significant variation in the refractive index.

This property applies more particularly in the case where the interference fringes are formed in the medium by two coherent beams reaching the same medium at different incidences. These interference fringes are translated in the volume of the optical medium by modulated illumination lines generating, after a writing time $\tau$, lines of variable index on which the beams are partly diffracted in accordance with the Bragg law.

If these coherent beams are respectively called the object beam and the reference beam, a fraction of the reference beam is diffracted along the path of the object beam in accordance with the Bragg law. The more effective the interaction of the medium, i.e. the higher the modulation level of the index lines, the higher the diffracted fraction of the reference beam.

As a function of the nature of the materials forming the interaction optical medium, the non-linearity of the dependence between the modulation level of the index lines and the modulation level of the illumination at the entrance to the medium then has two possible origins.

The non-linearity is direct, i.e. the index of the material, plotted on the ordinate, varies in a non-linear manner with the illumination plotted on the abscissa, in accordance with a curve 21 shown in FIG. 2. Therefore, a limited illumination modulation 22 about value $I_o$ corresponds to a high modulation 23 of the index about value $\Delta n_o$. This is the case with materials such as the semiconductors Si, CdTe, HgCdTe, CdS, InSb. Therefore, the thicknesses of the materials used should not be too great and specifically 1 to 2 mm in order not to lose too much radiation by absorption.

The non-linearity is indirect and is due to the wave coupling phenomenon within the interaction medium, the dependence between the index and the illumination being either linear or non-linear. On the front face of the medium, the interference of the incident object wave and the reference wave generates a system of index lines with a low modulation level, but which is adequate to diffract a small fraction of the reference wave onto the object wave. During propagation, this reinforced wave again interferes with the reference wave, which again generates a system of index lines with a somewhat greater modulation level, leading to the diffraction of a somewhat larger fraction of the reference wave onto the object wave and so on. If the index system undergoes a phase shift of precisely ($\pi/2$) with respect to the system of interference fringes, the new photo-induced system is in phase with the main system and the modulation level of the lines increases with the thickness of the medium traversed by the radiation. If this interaction thickness between the two beams within the medium is adequate, there is a significant energy transfer from the reference wave to the object wave. The materials falling into this category are, for example, photorefractive materials such as BSO, BGO, $KNbO_3$, $BaTiO_3$, certain transparent materials, such as $CS_2$ and Ge, or laser materials such as ruby. In this case, it is advantageous to use materials with a relatively high thickness of approximately one centimeter. For optimum operation certain materials can be polarized by an electrical field applied between two opposite faces.

FIG. 3 diagrammatically shows the interaction of an object beam and a reference beam in a non-linear interaction medium. An object wave 26 of random wave front $\Sigma_o$ and a reference wave 27 of planar wave front $\Sigma_R$ interfere in medium 2. These two waves 26 and 27 are coherent and interfere in the volume of medium 2. The interference network or system obtained induces in medium 2, with a time constant $\tau$ characteristic of the material, a system of index lines 25 which diffracts a fraction of the reference wave 27 in accordance with a diffracted wave $28_D$, precisely superimposed on the transmitted object wave 28. Diffracted wave $28_D$ has a wave front $\Sigma'_o$, which is strictly superimposed on the object wave front $\Sigma_o$, on leaving medium 2. The non-diffracted fraction of the reference wave traverses medium 2 and constitutes the transmitted reference wave 29, whilst retaining the same planar wave front $\Sigma_R$.

The energy transfer from the reference wave to the object wave corresponds to a reduction in the intensity of the reference wave after traversing the interaction medium. Following the writing time $\tau$ corresponding to the saturation recording of the system of lines from the interference system, the reference wave 29 transmitted in the presence of the object wave has undergone, compared with the reference wave transmitted in the absence of the object wave, an energy reduction corresponding to the gain on the transmitted object wave $28+28_D$ with interaction compared with the transmitted object wave 38 in the absence of interaction.

As a function of the materials used, the writing time $\tau$ varies from a few picoseconds to a few dozen milliseconds.

In the device according to the invention, consideration is given to two planar waves. $\Sigma_R$ is consequently the laser wave front in the cavity or oscillation wave, and $\Sigma_o$ the signal wave front from modulator 5. This signal wave makes it possible to initialize the laser effect in the desired direction. On considering $S_e$ as the amplitude of said wave before medium 2 and $S_s$ after medium 2, the following equations are obtained:

$$S_s = S_e \times exp(\Gamma - \alpha) \; 1$$

$\Gamma$ being the gain per unit of length of the non-linear medium 2 and 1 the interaction length in said medium $$\Gamma = 4\pi \frac{\Delta ns}{\lambda}$$

$\Delta ns$ being the variation of the photo-induced index on saturation in the medium, $\lambda$ the incident wavelength and $\alpha$ the losses by absorption and diffraction in the medium.

For example, the following values are obtained for photorefractive materials:

$$\Delta n_s \approx 10^{-5}$$

$$1 = 1 \text{ cm } \Gamma = 2.5 \text{ cm}^{-1}$$

$$\lambda = 0.5 \text{ }\mu\text{m}$$

$$\alpha \approx 1 \text{ cm}^{-1}$$

$$S_s = \exp[2.5 - 1]S_e$$

$$S_s = 4.5 \, S_e$$

This gives the saturation diffraction efficiency:

$$n_s = \sin^2 \frac{(\pi l \Delta n_s)}{\lambda}$$

$$n_s = \sin^2 \frac{\pi}{5} \approx 30\%.$$

Figure 4:
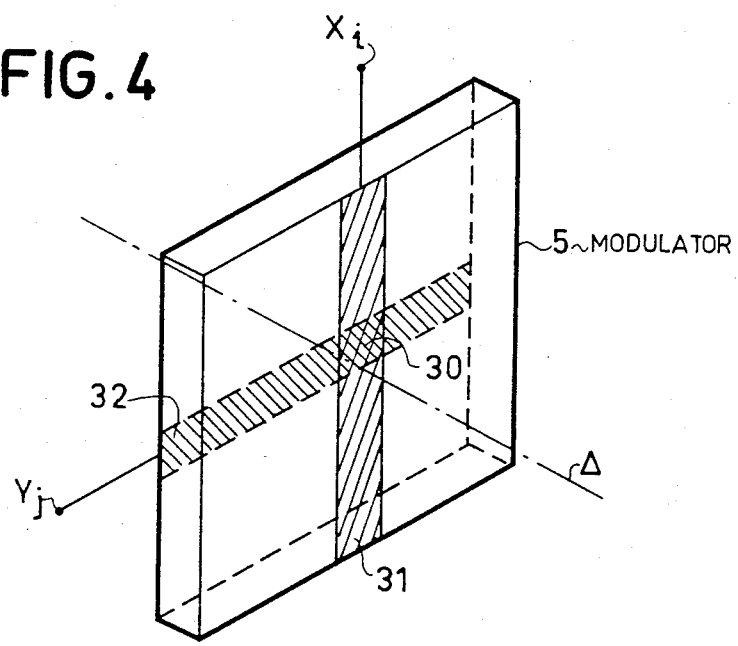

FIG. 4 shows the modulator 5. The radiation reaching modulator 5 enables the substantially uniform illumination of a selection matrix. This matrix, which is e.g. based on electrooptical material comprises $n^2$ elements, which can be made opaque or transparent under the control of external signals applied to two assemblies of n connections defining a matrix addressing of said $n^2$ elements. Only one of the connections $X_i$ and $Y_j$ is shown in the drawing. Each of these connections supplies a transparent, vertical conductive strip 31 for X and a horizontal transparent conductive strip 32 for Y. By applying a voltage equal to half the control voltage to a connection X and to a connection Y the intersection point to said strips is made transparent, which defines a luminous or bright element 30 on the dark background of the matrix.

Lens 6 shown in FIG. 1 makes it possible to obtain a parallel beam, which reaches medium 2 under a certain angle $\Delta\theta$. The lens, as well as matrix 5 and the radiation source are aligned on an axis $\Delta$. By selecting another luminous or bright element on the matrix with another set of connections $X_i$-$Y_j$, another beam is emitted, which will reach the medium 2 under a different angle of incidence.

For an operation with access X-Y, the electrooptical material must have a threshold effect on the transmission curve as a function of the voltage applied, as represented in FIG. 5 by curve T=f(V), $V_s$ being the threshold voltage.

Thus, the deflection direction is predetermined by the aperture of the window of coordinates X-Y on the electrooptical material. A very small part of the light flux is consequently used for initializing the photo-induced system or network in the non-linear material. The interference of this beam with the wave present in the cavity produces an index network in the interaction material 2 having a characteristic $\Delta n$ as a function of I, which is non-linear in the manner shown in FIG. 2. A very low incident modulation level on the material is consequently amplified, which gives rise to a diffraction of the laser wave in the cavity in the chosen direction, which forms an angle $\Delta\theta$ with the optical axis of the cavity. Angle $\Delta\theta$ is a function of the angle of incidence of the beam from modulator 5 and consequently of the window, which has been made luminous by applying control signals to corresponding electrodes $X_i$ and $Y_j$.

In the case illustrated in FIG. 6, the diffracted wave 15 is reflected by mirror 4 and returns to the cavity, whilst undergoing diffraction on the photo-induced phase network. According to this process, a stable oscillation can be established in the cavity in the absence of a signal wave from the window of coordinates X,Y of modulator 5. Thus, this signal wave is only used for initializing the laser effect in the desired direction. Thus, it is necessary to initialize the laser effect with a small signal.

In this way, an oscillation wave in broken line form (13, 10, 15) is obtained, whose inflection point is located within the interaction medium 2. The amplifying medium is a high gain laser material making it possible to compensate the losses suffered during the deflection in the non-linear medium. This medium is, for example, of the solid type in order to obtain a gain $\Gamma$ of approximately 10 cm$^{-1}$ and can be ruby or neodymium.

The system of lines must be stable, which necessitates a self-preservation of these lines. Mirror 4 must be perfectly spherical, so as not to lead to a displacement of the lines.

Mirrors 3 and 4 have reflection and transmission coefficients R, T, such that a low transmission is obtained, e.g. T being approximately 1%. Thus, an output beam in the direction desired is obtained.

Thus, as mirror 4 is spherical, it is possible to have n different oscillation directions varying in angular manner with respect to the center of curvature of the mirror, the choice of transmission axis being brought about by selecting two electrodes $X_i$ and $Y_j$ of modulator 5.

Thus, in the two cases considered and illustrated in FIGS. 1 and 6, a choice is made of the control voltage $V_{X1}$ and $V_{Y1}$, of bidimensional modulator 5. The voltages are maintained for an adequate time for a stable oscillation system to be established with the desired deflection in the cavity between mirrors 3 and 4. The output beam is then diffracted in a chosen direction $X_1$-$Y_1$.

In the case of a straight line oscillation wave illustrated in FIG. 1, the signal wave is permanently maintained throughout operation, so as to make it possible to obtain an output beam deflected onto the lines created in medium 2.

In the case of a broken line oscillation wave illustrated in FIG. 6, it is possible to eliminate this signal wave following the initialization of the process, because there is self-preservation of the lines produced in medium 2.

The passage to another direction firstly requires the blacking out of the photo-induced network. Thus, e.g. an electrooptical shutter can be inserted in the cavity between the amplifying medium 1 and the interaction medium 2 in order to stop the oscillation wave in the cavity and ensure the relaxation of the index modulation. Voltages $V_{X2}$ and $V_{Y2}$ are then applied to the bidirectional modulator 5, giving a positioning of the output laser beam in a direction $X_2$-$Y_2$.

Hitherto, consideration has been given to a non-linear deflection medium 2 realised with an electrooptical material, and it is also possible to consider a semiconductor medium in which the non-linearity induced is a function of the incident power density.

Modulator 5 in X-Y can be made from a material such as a bismuth silicon monocrystal, and can also be a ferroelectrical material, such as lead lanthanate zirconate titanate. It can also be formed from liquid crystals.

A system of control electrodes $X_iY_j$ of the matrix constituting the modulator can be e.g. a 100×100 or even a 600×600 network.

There are numerous applications of the device according to the invention, e.g. addressing and composition of images or pictures, tracking targets, designation of objectives, random or sequential access laser scanning as a function of voltages applied to the electrodes of modulator 5.

What is claimed is:

1. A coherent radiation source producing a beam having a regulatable propagation direction, comprising:
    a laser cavity defined by an amplifying medium positioned between first and second spherical mirrors and pumping means to permit generation of an oscillation wave in said cavity, said first mirror having a non-zero transmission coefficient to transmit a fraction of said oscillation wave; and
    deflection means for providing said beam, comprising:
    (a) an interaction medium placed within the cavity between said amplifying medium and said second mirror to tap an amount of said oscillation wave and to provide an output deflected laser beam in a desired direction upon reception of a signal wave, the center of curvature of said first and second mirrors coinciding and being located within said interaction medium; and
    (b) means for generating said signal wave including means for deriving said fraction of said oscillation wave to illuminate the area of a selection matrix of X-Y modulating means, said matrix being X-Y controlled to provide a corresponding X-Y transparent window, and optical means to transmit said derived oscillation wave which passes through said selected window towards said center of curvature to constitute said signal wave, the direction of the output deflected beam being a function of the angle of incidence of said signal wave determined by the X-Y position of said selected window.

2. A source according to claim 1, wherein said oscillation wave propagates in a straight line, said output deflected laser beam being said beam deflected by said interaction medium.

3. A source according to claim 1, wherein said second mirror also has a non-zero transmission coefficient, wherein said oscillation wave propagating in broken line form has an inflection point located within said interaction medium, said output deflected laser beam being obtained by transmission through said second mirror and said signal wave being eliminated after initialization by said generating means of said deflecting means.

4. A source according to claim 1, wherein said amplifying medium is a solid medium and is chosen from the group of materials consisting of essentially ruby and neodymium.

5. A source according to claim 1, wherein said selection matrix of said generating means has two orthogonal assemblies of n electrodes defining an addressing of $n^2$ elements, said matrix being followed by a convergent lens.

6. A source according to claim 5, wherein said selection matrix is made from any one of an electrooptical material, a ferroelectric material and liquid crystals.

7. A source according to claim 1, wherein said interaction medium is an electrooptical material.

8. A source according to claim 7, wherein said electrooptical material is a bismuth silicon monocrystal.

9. A source according to claim 1, wherein an electrooptical shutter is placed in the path of said oscillation wave.

* * * * *